United States Patent
Zhang et al.

(10) Patent No.: US 12,452,863 B2
(45) Date of Patent: Oct. 21, 2025

(54) DYNAMIC DOWNLINK ASSIGNMENT INDICATOR (DAI) COUNTING AND HYBRID AUTOMATIC REPEAT REQUEST ACKNOWLEDGEMENT (HARQ-ACK) CODEBOOK GENERATION FOR ENHANCED PHYSICAL DOWNLINK CONTROL CHANNEL (PDCCH) TRANSMISSION

(71) Applicant: Lenovo (Beijing) Ltd., Beijing (CN)

(72) Inventors: Yi Zhang, Chao Yang District (CN); Chenxi Zhu, Haidian District (CN); Bingchao Liu, Changping District (CN); Wei Ling, Changping (CN); Lingling Xiao, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 396 days.

(21) Appl. No.: 18/001,495

(22) PCT Filed: Jun. 12, 2020

(86) PCT No.: PCT/CN2020/095816
§ 371 (c)(1),
(2) Date: Dec. 12, 2022

(87) PCT Pub. No.: WO2021/248452
PCT Pub. Date: Dec. 16, 2021

(65) Prior Publication Data
US 2023/0224898 A1  Jul. 13, 2023

(51) Int. Cl.
*H04W 72/00* (2023.01)
*H04L 1/1812* (2023.01)
(Continued)

(52) U.S. Cl.
CPC ....... *H04W 72/1273* (2013.01); *H04L 1/1812* (2013.01); *H04W 72/23* (2023.01)

(58) Field of Classification Search
CPC ............... H04W 72/1273; H04W 72/23; H04L 1/1812; H04L 5/0044; H04L 5/0053;
(Continued)

(56) References Cited

U.S. PATENT DOCUMENTS

2014/0036856 A1* 2/2014 Park ............... H04L 5/0053
370/329
2019/0342035 A1  11/2019 Zhang et al.
(Continued)

FOREIGN PATENT DOCUMENTS

CN    110876204 A    3/2020
WO    2017078454 A1  5/2017

OTHER PUBLICATIONS

Nokia, et al., "Enhancements on Multi-TRP/Panel Transmission", 3GPP Draft; R1-1912719, vol. RAN WG1, Nov. 8, 2019, 15 pages (Year: 2019).*
(Continued)

*Primary Examiner* — Lan-Huong Truong
(74) *Attorney, Agent, or Firm* — FIG. 1 Patents

(57) ABSTRACT

Apparatus and methods of dynamic DAI counting and HARQ-ACK codebook generation for enhanced PDCCH transmission are disclosed. The apparatus includes: a processor that generates a common Downlink Assignment Indicator (DAI) value for a set of Physical Downlink Control Channel (PDCCH) transmissions, wherein the set of PDCCH transmissions are used to transmit first Downlink Control Information (DCI) that schedules a common Physical Downlink Shared Channel (PDSCH) transmission, and the common DAI value is generated based on a first reference PDCCH, wherein the first reference PDCCH is one of the PDCCH transmissions; a transmitter that transmits the first Downlink Control Information (DCI) with the set of PDCCH transmissions; and a receiver that receives a Hybrid Automatic Repeat Request Acknowledgement (HARQ-
(Continued)

ACK) codebook with feedback information bits ordered based on a second reference PDCCH, wherein the second reference PDCCH is one of the PDCCH transmissions.

20 Claims, 5 Drawing Sheets

(51) Int. Cl.
*H04W 72/1273* (2023.01)
*H04W 72/23* (2023.01)

(58) Field of Classification Search
CPC ..... H04L 5/0094; H04L 5/001; H04L 1/1861; H04L 5/0055; H04L 1/1864; H04L 1/1858
See application file for complete search history.

(56) References Cited

U.S. PATENT DOCUMENTS

| | | | |
|---|---|---|---|
| 2021/0021381 A1* | 1/2021 | Saber | H04L 5/0091 |
| 2023/0155736 A1* | 5/2023 | Kim | H04L 1/1864 370/329 |

OTHER PUBLICATIONS 20940073.8 , "Extended European Search Report", European Application No. 20940073.8, Feb. 12, 2024, 10 pages.
Nokia , et al., "Enhancements on Multi-TRP/Panel Transmission", 3GPP Draft; R1-1912719, vol. RAN WG1, Nov. 8, 2019, 15 pages.
Nokia , "Remaining issues on NR-U HARQ scheduling and feedback", 3GPP TSG RAN WG1 Meeting #100b, R1-2002227, e-Meeting [retrieved Dec. 14, 2022]. Retrieved from the Internet <https://www.3gpp.org/ftp/TSG_RAN/WG1_RL1/TSGR1_100b_e/Docs/>., Apr. 2020, 15 Pages.
PCT/CN2020/095816 , "International Preliminary Report on Patentability", PCT Application No. PCT/CN2020/095816, Dec. 22, 2022, 5 pages.
PCT/CN2020/095816 , "International Search Report and Written Opinion", PCT Application No. PCT/CN2020/095816, Feb. 25, 2021, 6 pages.
202080101529.6 , "Foreign Office Action", CN Application No. 202080101529.6, Jun. 5, 2024, 13 pages.
Chinese "Notice of Grant", Jan. 28, 2025, 4 pages.
"Foreign Office Action", KR Application No. 10-2022-7042344, Jul. 11, 2025, 11 pages.
CATT, "Remaining issues on multi-TRP/panel transmission", 3GPP TSG RAN WG1 #99, R1-1912176, [Retrieved from the Internet], <https://www.3gpp.org/ftp/tsg_ran/WG1_RL1/TSGR1_99/Docs>, Nov. 9, 2019, 21 pages.
Huawei, et al., "Feature Summary of Enhancements on Multi-TRP/Panel Transmission", 3GPP TSG RAN WG1 Meeting #99, R1-1913299, [Retrieved from the Internet] <https://www.3gpp.org/ftp/tsg_ran/WG1_RL1/TSGR1_99/Docs>, Nov. 26, 2019, 88 pages.

* cited by examiner

DYNAMIC DOWNLINK ASSIGNMENT INDICATOR (DAI) COUNTING AND HYBRID AUTOMATIC REPEAT REQUEST ACKNOWLEDGEMENT (HARQ-ACK) CODEBOOK GENERATION FOR ENHANCED PHYSICAL DOWNLINK CONTROL CHANNEL (PDCCH) TRANSMISSION

FIELD

The subject matter disclosed herein relates generally to wireless communication and more particularly relates to, but not limited to, apparatus and methods of dynamic Downlink Assignment Indicator (DAI) counting and Hybrid Automatic Repeat Request Acknowledgement (HARQ-ACK) codebook generation for enhanced Physical Downlink Control Channel (PDCCH) transmission.

BACKGROUND

The following abbreviations and acronyms are herewith defined, at least some of which are referred to within the specification:
Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Hybrid Automatic Repeat Request (HARQ), Acknowledgement (ACK), Hybrid Automatic Repeat Request Acknowledgement (HARQ-ACK), Negative Acknowledgement (NACK), Physical Downlink Control Channel (PDCCH), Physical Downlink Shared Channel (PDSCH), Physical Uplink Control Channel (PUCCH), Bandwidth Part (BWP), Control Resource Set (CORESET), Downlink Assignment Index (DAI), Downlink Control Information (DCI), Frequency-Division Multiplexing (FDM), Frequency Division Multiple Access (FDMA), Identification (ID), Semi-Persistent Scheduling (SPS), Time-Division Multiplexing (TDM), Transmit Receive Point (TRP), Component Carrier (CC), Frequency Range 1 (FR1), Frequency Range 2 (FR2), Transmission Configuration Indication (TCI).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In conventional schemes defined in Release 15 and 16 specifications, only single PDCCH transmission for one Downlink Control Information (DCI) is supported for DAI counting and HARQ-ACK codebook generation. The DAI counter is increased by 1 when there is an additional PDCCH transmission. HARQ-ACK bits are concatenated in the same order as DAI counting. In detail, HARQ-ACK bits are concatenated increasingly at first level according to CORESETPool index, at second level according to Component Carrier (CC) index and at third level according to PDCCH monitoring occasion index.

With multiple TRPs, PDCCH may be transmitted multiple times with different time/frequency/spatial resources. For one DCI, there may be multiple PDCCH monitoring occasions. According to the current type-2 HARQ-ACK codebook determination scheme, the downlink assignment indicators (DAIs), including both counter DAI (c-DAI) and total DAI (t-DAI), are counted based on the accumulative number of {serving cell, PDCCH monitoring occasion} pairs. New schemes for DAI counting and HARQ-ACK codebook generation are proposed in the case of multiple PDCCH monitoring occasions for one DCI.

SUMMARY

Apparatus and methods of dynamic DAI counting and HARQ-ACK codebook generation for enhanced PDCCH transmission are disclosed.

According to a first aspect, there is provided an apparatus, including: a processor that generates a common Downlink Assignment Indicator (DAI) value for a set of Physical Downlink Control Channel (PDCCH) transmissions, where the set of PDCCH transmissions are used to transmit first Downlink Control Information (DCI) that schedules a common Physical Downlink Shared Channel (PDSCH) transmission, and the common DAI value is generated based on a first reference PDCCH, where the first reference PDCCH is one of the PDCCH transmissions; a transmitter that transmits the first Downlink Control Information (DCI) with the set of PDCCH transmissions; and a receiver that receives a Hybrid Automatic Repeat Request Acknowledgement (HARQ-ACK) codebook with feedback information bits ordered based on a second reference PDCCH, where the second reference PDCCH is one of the PDCCH transmissions.

According to a second aspect, there is provided an apparatus, including: a receiver that receives a set of Physical Downlink Control Channel (PDCCH) transmissions that transmit first Downlink Control Information (DCI), where the first DCI transmitted with the set of PDCCH transmissions schedules a common Physical Downlink Shared Channel (PDSCH) transmission, and the set of PDCCH transmissions include a common Downlink Assignment Indicator (DAI) value which is generated based on a first reference PDCCH, and where the first reference PDCCH is one of the PDCCH transmissions; a processor that generates a Hybrid Automatic Repeat Request Acknowledgement (HARQ-ACK) codebook with feedback information bits ordered based on a second reference PDCCH, where the second reference PDCCH is one of the PDCCH transmissions; and a transmitter that transmits the HARQ-ACK codebook.

According to a third aspect, there is provided a method, including: generating, by a processor, a common Downlink Assignment Indicator (DAI) value for a set of Physical Downlink Control Channel (PDCCH) transmissions, where the set of PDCCH transmissions are used to transmit first Downlink Control Information (DCI) that schedules a common Physical Downlink Shared Channel (PDSCH) transmission, and the common DAI value is generated based on a first reference PDCCH, where the first reference PDCCH is one of the PDCCH transmissions; transmitting, by a transmitter, the first Downlink Control Information (DCI) with the set of PDCCH transmissions; and receiving, by a receiver, a Hybrid Automatic Repeat Request Acknowledgement (HARQ-ACK) codebook with feedback information bits ordered based on a second reference PDCCH, where the second reference PDCCH is one of the PDCCH transmissions.

According to a fourth aspect, there is provided a method, including: receiving, by a receiver, a set of Physical Downlink Control Channel (PDCCH) transmissions that transmit first Downlink Control Information (DCI), where the first DCI transmitted with the set of PDCCH transmissions schedules a common Physical Downlink Shared Channel (PDSCH) transmission, and the set of PDCCH transmissions include a common Downlink Assignment Indicator (DAI) value which is generated based on a first reference PDCCH, and where the first reference PDCCH is one of the PDCCH transmissions; generating, by a processor, a Hybrid Automatic Repeat Request Acknowledgement (HARQ-ACK) codebook with feedback information bits ordered based on a second reference PDCCH, where the second reference PDCCH is one of the PDCCH transmissions; and transmitting, by a transmitter, the HARQ-ACK codebook.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
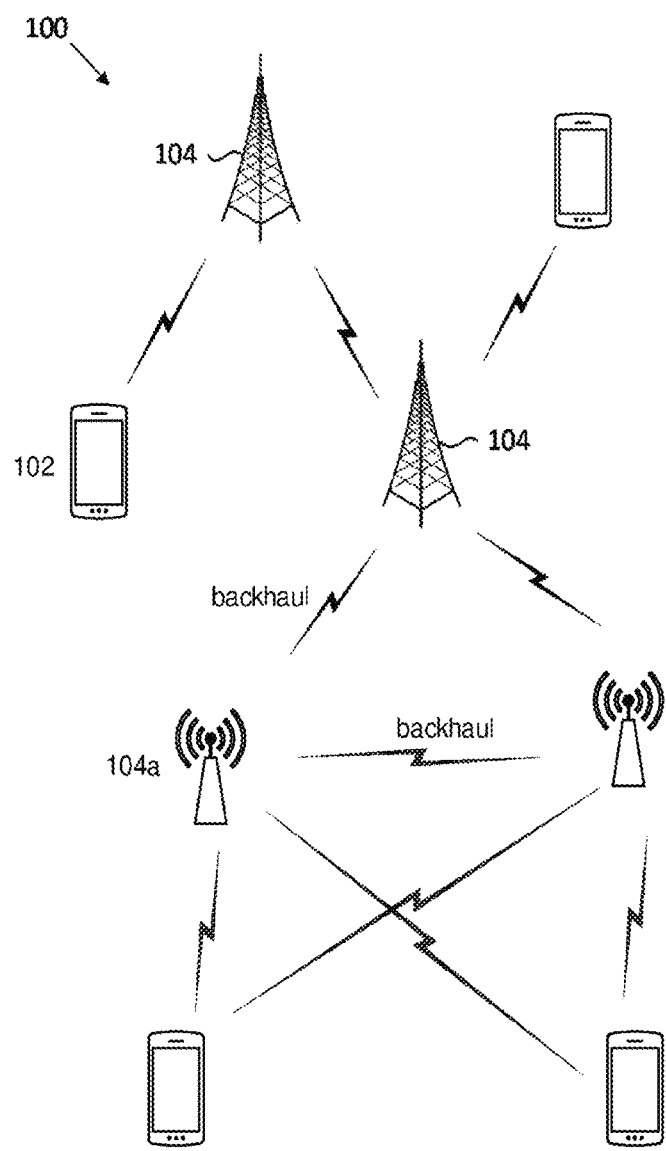
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported. In a single TRP scenario, multiple PDCCH transmissions from one TRP may be made for one DCI transmission, with multiple panels for example. In some other examples, multiple PDCCH transmissions may also be possible for a single TRP with a single panel.

Figure 2:
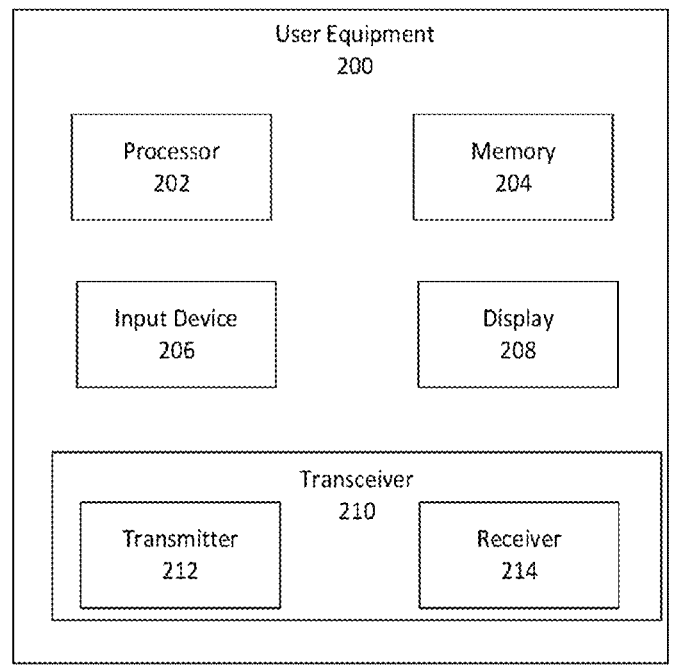
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
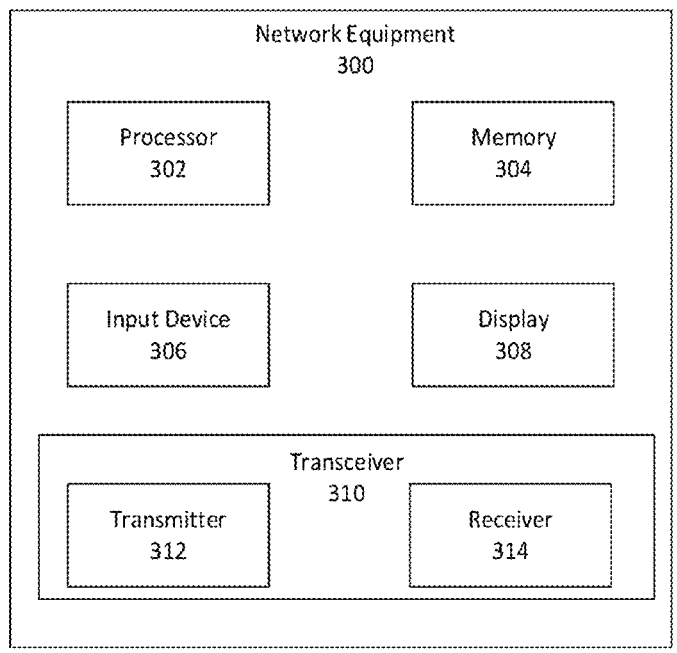
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

The set of PDCCH monitoring occasions for a DCI format scheduling PDSCH receptions or SPS PDSCH release is defined as the union of PDCCH monitoring occasions across active DL BWPs of configured serving cells. PDCCH monitoring occasions are indexed in an ascending order of start time of the search space set associated with a PDCCH monitoring occasion. The cardinality of the set of PDCCH monitoring occasions defines a total number of PDCCH monitoring occasions.

A value of the counter downlink assignment indicator (c-DAI) field in DCI formats denotes the accumulative number of {serving cell, PDCCH monitoring occasion} pair(s) in which PDSCH reception(s) or SPS PDSCH release associated with the DCI formats is present, up to the current serving cell and current PDCCH monitoring occasion, first in ascending order of serving cell index and then in ascending order of PDCCH monitoring occasion index. If, for an active DL BWP of a serving cell, the UE is not provided with CORESETPoolIndex or is provided with CORESETPoolIndex of value 0 for one or more first CORESETs and CORESETPoolIndex of value 1 for one or more second CORESETs, and the UE is provided with ACKNACKFeedbackMode=JointFeedback, the value of counter DAI is in the order of the first CORESETs followed by the second CORESETs for the same serving cell index and same PDCCH monitoring occasion index.

The value of the total DAI (t-DAI) in a DCI format denotes the total number of {serving cell, PDCCH monitoring occasion} pair(s) in which PDSCH reception(s) or SPS PDSCH release associated with DCI formats is present, up to the current PDCCH monitoring occasion and is updated from PDCCH monitoring occasion to PDCCH monitoring occasion. If, for an active DL BWP of a serving cell, the UE is not provided with CORESETPoolIndex or is provided with CORESETPoolIndex of value 0 for one or more first CORESETs and CORESETPoolIndex of value 1 for one or more second CORESETs, and the UE is provided ACKNACKFeedbackMode=JointFeedback, the {serving cell, PDCCH monitoring occasion} pair(s) is/are counted for both the first CORESETs and the second CORESETs in the total DAI.

If the UE transmits HARQ-ACK information in a PUCCH in slot n and for any PUCCH format, the UE determines the $\tilde{o}_0^{ACK}, \tilde{o}_1^{ACK}, \ldots, \tilde{o}_{O^{ACK}-1}^{ACK}$, for a total number of $O_{ACK}$ HARQ-ACK information bits. HARQ-ACK bits are concatenated first in order of CORESETPool index, then in order of CC index, and lastly in ascending order of PDCCH monitoring occasion index.

That is, mechanisms for DAI counting and HARQ-ACK codebook generation are well defined for PDCCH without multiple transmissions. However, they cannot be directly applied to PDCCH with multiple transmissions.

Figure 4:
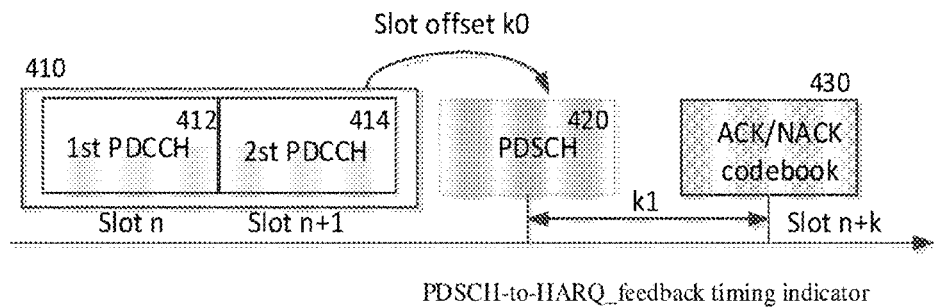
FIG. 4 is a schematic diagram illustrating an example of HARQ time procedure in accordance with some implementations of the present disclosure.

FIG. 4 illustrates an example of the HARQ time procedure for PDCCH with multiple transmissions. In the example, PDSCH 420 is scheduled by PDCCH with multiple transmissions 410, i.e., the first PDCCH 412 in slot n and the second PDCCH 414 in slot n+1. That is, multiple PDCCH transmissions 412 and 414 are used to transmit a DCI that schedules the PDSCH transmission 420. Relative to the last PDCCH (the second PDCCH 414) of multiple transmissions, PDSCH is transmitted with slot offsets $K_0$ provided by time domain resource assignment field in a DCI format scheduling PDSCH receptions or SPS PDSCH release and by pdsch-AggregationFactor, when provided. PUCCH transmission time instance with HARQ-ACK information (e.g. ACK/NACK codebook 430) is determined by $K_1$, i.e. PDSCH-to-HARQ_feedback timing indicator field values in response to PDSCH receptions or SPS PDSCH release.

In the present disclosure, schemes for DAI counting and HARQ-ACK codebook generation based on reference PDCCH are proposed for the cases where PDSCHs are scheduled by PDCCH with multiple transmissions. In some embodiments, the multiple transmissions may be achieved by multiple TRPs or transmitting-receiving identities, and/or multiple panels.

The PDCCH with multiple transmissions for a DCI may be counted only once for DAI counting since it is assumed that the same DCI contents are used for multiple PDCCH transmissions to achieve combination gain. One of the PDCCH transmissions may be determined as a reference PDCCH according to some predefined rules. Various schemes for DAI counting and HARQ-ACK codebook generation are proposed based on different assumptions on the reference PDCCH. Moreover, the reference PDCCHs for DAI counting and HARQ-ACK codebook generation may be the same or different on account of different requirements.

Figure 5A:
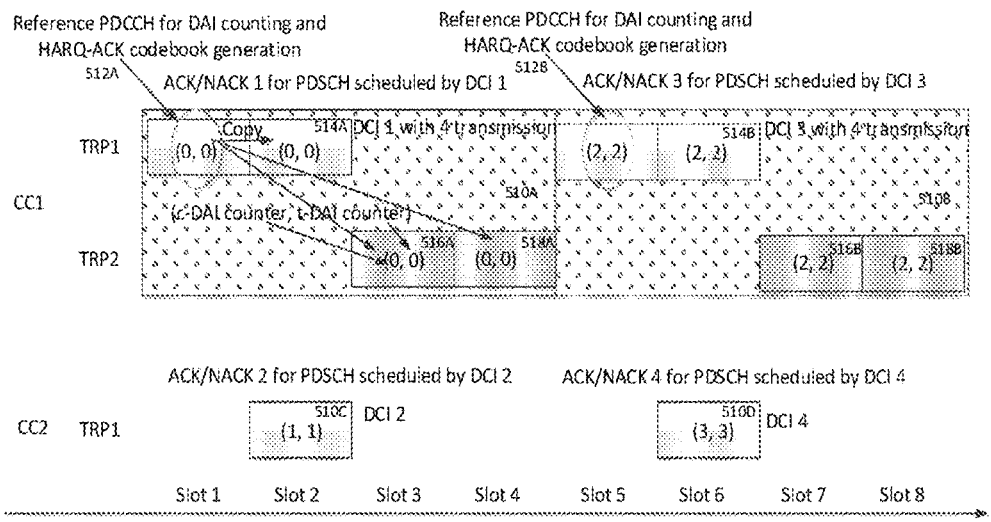
FIG. 5A is a schematic diagram illustrating an example of DAI counting and HARQ-ACK codebook generation in accordance with some implementations of the present disclosure.
Figure 5B:
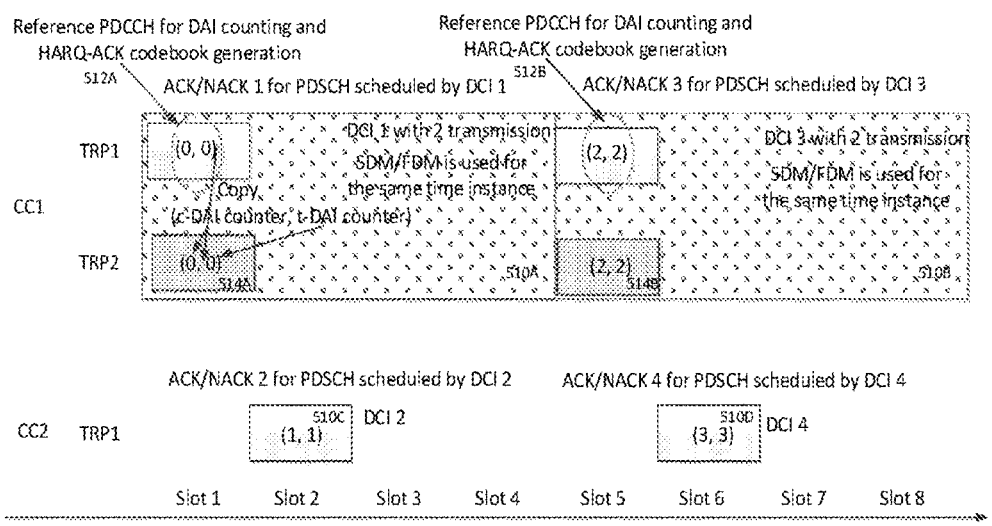
FIG. 5B is a schematic diagram illustrating another example of DAI counting and HARQ-ACK codebook generation in accordance with some implementations of the present disclosure.

First PDCCH Transmission as Reference PDCCH for Both DAI Counting and HARQ-ACK Codebook Generation FIG. 5A is a schematic diagram illustrating an example of DAI counting and HARQ-ACK codebook generation in accordance with some implementations of the present disclosure; and FIG. 5B is a schematic diagram illustrating another example of DAI counting and HARQ-ACK codebook generation in accordance with some implementations of the present disclosure.

In the examples, the first PDCCH in multiple transmissions may serve as the reference PDCCH for PDCCH with multiple transmissions for both DAI counting and HARQ-ACK codebook generation. The DAI value is generated based on the reference PDCCH, and the feedback information bits are ordered based the reference PDCCH.

For type-2 HARQ-ACK codebook generation, when determining the values of the counter DAI and total DAI, the PDCCH in the first PDCCH monitoring occasion, i.e. slot, serves as the reference PDCCH. The remaining PDCCHs of the multiple transmissions are not used for counting. For all the DCIs with and without multiple transmissions, the related DAIs are accumulated increasingly at first level according to CORESETPool index, at second level according to CC index, and at third level according to PDCCH monitoring occasion index, in which the scheme for DAI counting in Release 15 and 16 (DAI counting for DCIs without multiple transmissions) is reused as much as possible.

In the example shown in FIG. 5A, four DCIs (i.e., DCI 1 510A, DCI 2 510C, DCI 3 510B and DCI 4 510D) are transmitted by two TRPs (i.e., TRP1 and TRP2) on two CCs (i.e., CC1 and CC2). DCI 1 510A and DCI 3 510B are each transmitted with four PDCCH transmissions on CC1, in which two of the four PDCCH transmissions for DCI 1 510A (512A and 514A) are transmitted from TRP1 in slot 1 and slot 2, respectively, and the other two PDCCH transmissions for DCI 1 (516A, 518A) are transmitted from TRP2 in slot 3 and slot 4, respectively. Two of the four PDCCH transmissions for DCI 3 510B (512B and 514B) are transmitted from TRP1 in slot 5 and slot 6, respectively, and the other two PDCCH transmissions for DCI 3 (516B, 518B) are transmitted from TRP2 in slot 7 and slot 8, respectively. DCI 2 510C and DCI 4 510D are each transmitted without multiple PDCCH transmissions, e.g., by a single transmission in slot 2 and in slot 6, respectively.

In the example, the first PDCCH in the multiple transmissions serves as the reference PDCCH for DAI counting. That is, (c-DAI, t-DAI) value for the DCI 1 is (0, 0) based on the reference PDCCH, 512A, which is the first one of the multiple PDCCH transmissions for DCI 1; (c-DAI, t-DAI) value for the DCI 2 is (1, 1) with accumulative accounting; (c-DAI, t-DAI) value for the DCI 3 is (2, 2) based on the reference PDCCH 512B for DCI 3, 512B, and (c-DAI, t-DAI) value for the DCI 4 is (3, 3).

In the example, the reference PDCCH for a DCI is determined as the first one in the list of multiple PDCCH transmissions for the DCI, and the list is sorted at first level according to Control Resource Set Pool (CORESETPool), or Control Resource Set (CORESET), or activated Transmission Configuration Indication (TCI) state index, at second level according to Component Carrier (CC) index, and at third level according to PDCCH monitoring occasion index.

It is noted that for DCI with multiple transmissions, the DAI values in other PDCCHs of multiple transmissions, e.g., 514A, 516A and 518A, are the same as that in the reference PDCCH, e.g., 512A.

In the example, for one DCI with multiple transmissions, the DAI values are generated based on its reference PDCCH; and for one DCI without multiple transmissions, the DAI values are generated based on the PDCCH transmitting the DCI. The DAI values for all DCIs (DCIs with and without multiple transmissions) are determined (or counted) according to a list of the DCIs sorted based on the reference PDCCHs for the DCIs with multiple transmissions and the PDCCH transmissions for the DCIs without multiple transmissions, at first level according to Control Resource Set Pool (CORESETPool), or Control Resource Set (CORESET), or activated Transmission Configuration Indication (TCI) state index, at second level according to Component Carrier (CC) index, and at third level according to PDCCH monitoring occasion index.

For HARQ-ACK codebook generation, only one HARQ-ACK bit(s) corresponds to one DCI with multiple transmissions since the DCI schedules only one PDSCH. The PDCCH in the first PDCCH monitor occasion, i.e. slot, serves as the reference PDCCH to determine the HARQ ACK bit(s) location for PDSCH scheduled by PDCCH with multiple transmissions. The ACK/NACK bits corresponding to all the DCIs are concatenated increasingly at first level according to CORESETPool index at second level according to CC index and at third level according to PDCCH monitoring occasion index. That is, the ACK/NACK bits corresponding to all the DCIs are concatenated based on the above sorted list of the DCIs.

In the example shown in FIG. 5A, the HARQ-ACK codebook may be concatenated as: {ACK/NACK 1, ACK/NACK 2, ACK/NACK 3, ACK/NACK 4}.

The location of ACK/NACK 1 is determined by the reference PDCCH 512A with the smallest PDCCH monitoring occasion index in multiple transmissions. In this example, ACK/NACK 1 is obtained later than ACK/NACK 2 since its corresponding DCI 510A is determined only after receiving the four PDCCH transmissions for DCI 1 in slot 4, but ACK/NACK 1 is concatenated before ACK/NACK 2 based on the reference PDCCH 512A for DCI 1 and the PDCCH 510C for DCI 2.

In this example, the reference PDCCH or the first PDCCH is the PDCCH with the lowest PDCCH monitoring occasion index since Time-Division Multiplexing (TDM) scheme is used for PDCCH with multiple transmissions.

In some other examples, Space-Division Multiplexing (SDM) and Frequency-Division Multiplexing (FDM) schemes may also be used for PDCCH with multiple transmissions, where PDCCH with multiple transmissions may be transmitted with SDM/FDM from multiple TRPs.

For SDM/FDM schemes as shown in FIG. 5B, the reference PDCCH or the first PDCCH may be the PDCCH with the smallest index in a list of the multiple PDCCH transmissions, which is sorted at first level according to Control Resource Set Pool (CORESETPool index), at second level according to Component Carrier (CC) index, and at third level according to PDCCH monitoring occasion index. In the example shown in FIG. 5B, DCI 1 510A is transmitted two times with SDM/FDM, where 2 PDCCHs, i.e. 512A and 514A, are transmitted from TRP1 and TRP2, respectively, on same CCEs for SDM or different CCEs for FDM. In this case, since the PDCCH monitoring occasion, i.e. the first slot, is the same for these two transmissions, new dimensions, i.e. CC index and CORESETPool index, are used for sorting to define a reference PDCCH. For example, since the PDCCH 512A from TRP1 has a smaller CORESETPool index than the PDCCH 514A from TRP2, the PDCCH 512A from TRP1 is sorted in front of the PDCCH 514A from TRP2. Thus, the PDCCH 512A from TRP1 is the first PDCCH, and may be determined as the reference PDCCH for DAI counting and HARQ-ACK codebook generation.

In the example shown in FIG. 5B, the HARQ-ACK codebook may be concatenated as: {ACK/NACK 1, ACK/NACK 2, ACK/NACK 3, ACK/NACK 4}.

In the present disclosure, CORESETPool index is used to denote TRP index. For some cases, it may not be configured since it is just an optional signalling for one CORESET. For cases where the CORESETPool index is not configured, CORESET index may be used for defining the reference PDCCH. CORESET index may be used in the case of configuration with multiple CORESETs and one TCI state for one CORESET. Alternatively, TCI state index of multiple activated TCI states may be used for defining the reference PDCCH. It may be used in the case of configuration with multiple TCI states for a single CORESET.

Figure 6:
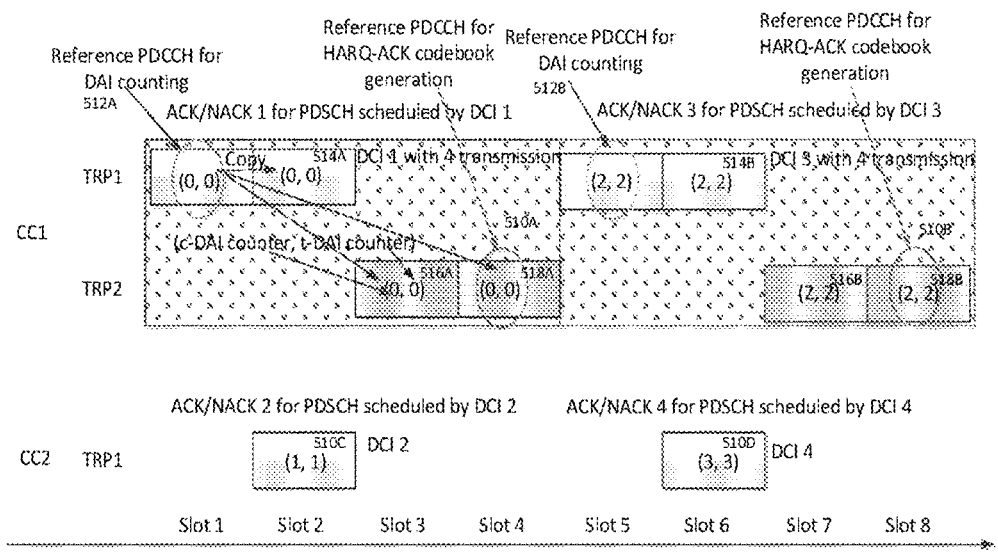
FIG. 6 is a schematic diagram illustrating a further example of DAI counting and HARQ-ACK codebook generation in accordance with some implementations of the present disclosure.

First PDCCH Transmission as Reference PDCCH for DAI Counting, and Last PDCCH Transmission as Reference PDCCH for HARQ-ACK Codebook Generation FIG. 6 is a schematic diagram illustrating a further example of DAI counting and HARQ-ACK codebook generation in accordance with some implementations of the present disclosure.

In this example, two reference PDCCHs may be defined, namely a first reference PDCCH for DAI counting and a second reference PDCCH for HARQ-ACK codebook generation. The first PDCCH in multiple transmissions may serve as the reference PDCCH for DAI counting (i.e., the first reference PDCCH) for PDCCH with multiple transmissions, and the last PDCCH in multiple transmissions may serve as the reference PDCCH for HARQ-ACK codebook generation (i.e., the second reference PDCCH) for PDCCH with multiple transmissions.

The last PDCCH in multiple transmissions may also serve as the reference PDCCH for DAI counting for PDCCH with multiple transmissions. However, this may not be preferable for gNB's realization, since the gNB has to determine the DAI values based on a later PDCCH number. FIG. 6 illustrates an example of DCI/PDCCH transmissions similar to FIG. 5A. As shown in FIG. 6, the gNB has to determine a DAI value for the PDCCH 512A transmitted in slot 1 based on the scheduling PDCCH numbers in slot 2, 3 and 4 on multiple CCs. Thus, in this example, the first PDCCH (e.g., 512A and 512B) of multiple transmissions is still used as the reference PDCCH for DAI counting.

For HARQ-ACK codebook generation, the PDCCH in the last PDCCH monitor occasion, i.e. slot, may serve as the reference PDCCH to determine HARQ ACK bit(s) location for PDSCH scheduled by PDCCH with multiple transmissions. ACK/NACK bits corresponding to all the DCIs are concatenated increasingly at first level according to the CORESETPool index, then at second level according to the CC index and lastly at third level according to the PDCCH monitoring occasion index.

In the example shown in FIG. 6, the HARQ-ACK codebook may be concatenated as: {ACK/NACK 2, ACK/NACK 1, ACK/NACK 4, ACK/NACK 3}.

The location of ACK/NACK 1 is determined by the second reference PDCCH 518A with the largest PDCCH monitoring occasion of multiple transmissions. Here, ACK/NACK 1 is obtained later than ACK/NACK 2 since its corresponding DCI 1 510A is determined only after receiving the four PDCCH transmissions for DCI 1 in slot 4, whereas the DCI 2 510C is determined after the transmission in slot 2. Thus, ACK/NACK 1 is concatenated after ACK/NACK 2 in this case.

In this example, the first and second reference PDCCHs, i.e., the first and the last PDCCHs, may be PDCCHs with the lowest and largest PDCCH monitoring occasion indices as TDM scheme is used for PDCCH with multiple transmissions. In some other examples, SDM and FDM schemes may also be used for PDCCH with multiple transmissions. The first or last PDCCH may be defined as the PDCCH with the smallest or largest index in a list of the PDCCHs, respectively, where PDCCH with multiple transmissions are sorted increasingly with first level on CORESETPool index, then second level on CC index and then the third level on PDCCH monitoring occasion index.

In the example, the DAI value for a DCI is generated based on the first reference PDCCH for the DCI, and the feedback information bits are ordered based the second reference PDCCH for the DCI. The DAI values for all DCIs are determined similar to the earlier example. The ACK/NACK bits corresponding to all the DCIs (DCIs with and without multiple transmissions) are concatenated are according to a list of the DCIs sorted based on the second reference PDCCHs for DCIs with multiple transmissions and the PDCCH transmission for DCIs without multiple transmissions, at first level according to Control Resource Set Pool (CORESETPool), at second level according to Component Carrier (CC) index, and at third level according to PDCCH monitoring occasion index.

Similar to the examples shown in FIGS. 5A and 5B, in this example and some other examples, CORESETPool index is also used to denote TRP index. For some cases, it may not be configured since it is just an optional signalling for one CORESET. For cases where the CORESETPool index is not configured, CORESET index may be used for defining the reference PDCCH. CORESET index may be used in the case of configuration with multiple CORESETs and one TCI state for one CORESET. Alternatively, TCI state index of multiple activated TCI states may be used for defining the reference PDCCH. It may be used in the case of configuration with multiple TCI states for a single CORESET.

Figure 7:
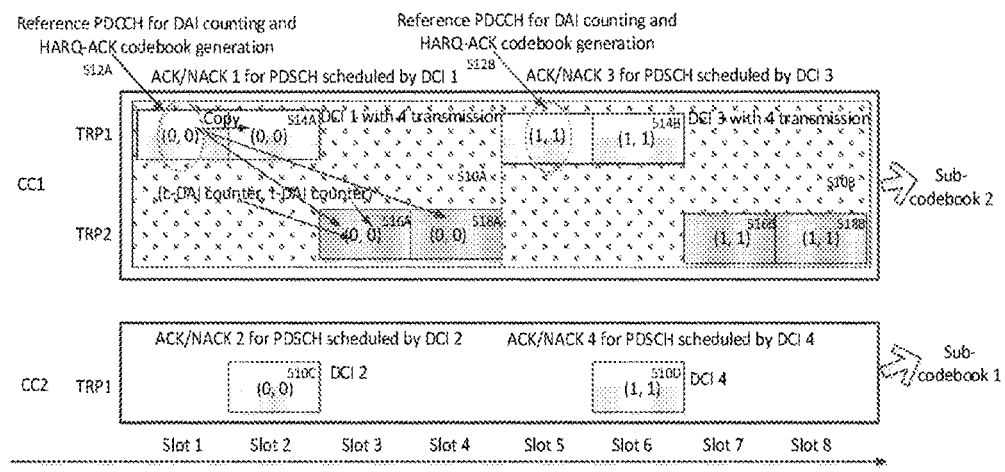
FIG. 7 is a schematic diagram illustrating a yet further example of DAI counting and HARQ-ACK codebook generation in accordance with some implementations of the present disclosure.

Separate DAI Counting and HARQ-ACK Codebook Generation for PDCCH with Multiple Transmission FIG. 7 is a schematic diagram illustrating a yet further example of DAI counting and HARQ-ACK codebook generation in accordance with some implementations of the present disclosure.

When different ACK/NACK feedback time procedures are used for PDSCH scheduled by PDCCH with and without multiple transmissions, separate DAI counting and HARQ-ACK codebook generation may be used in the case of PDSCH scheduled by PDCCH with and without multiple transmissions.

For DAI counting, the same scheme in Release 15 and 16 may be used for PDCCH without multiple transmissions. For PDCCH with multiple transmissions, the reference PDCCH has to be determined. Similar to earlier examples, the first PDCCH may serve as the reference PDCCH for DAI counting and HARQ-ACK codebook generation for PDCCH with multiple transmissions. FIG. 7 illustrates an example of DCI/PDCCH transmissions similar to FIG. 5A. As shown in FIG. 7, DAI counting is performed separately for PDCCH without multiple transmissions (e.g., DCI 2 and DCI 4) and for PDCCH with multiple transmissions (e.g., DCI 1 and DCI 3). For example, (c-DAI, t-DAI) value for the DCI 2 is (0, 0) and (c-DAI, t-DAI) value for the DCI 4 is (1, 1); (c-DAI, t-DAI) value for the DCI 1 is (0, 0) and (c-DAI, t-DAI) value for the DCI 3 is (1, 1) based on the reference PDCCHs. For PDCCH with multiple transmissions, the reference PDCCH for DAI counting is the PDCCH with the first monitoring occasion, e.g., the PDCCH 512A for DCI 1. The DAI values in other PDCCHs of multiple transmissions, e.g., 514A, 516A and 518A, are the same as that in the reference PDCCH 512A for DCI 1. The first PDCCH serving as the reference PDCCH in the example may be defined as the PDCCH with the smallest index where PDCCH with multiple transmissions are sorted increasingly with first level on CORESETPool index, then second level on CC index and then the third level on smallest PDCCH monitoring occasion index.

In this example, the DAI values for DCIs without multiple transmissions are independent from the DAI values for DCIs with multiple transmissions, and they are determined separately.

For HARQ-ACK codebook generation, two sub-codebooks are generated separately for PDSCHs scheduled by PDCCH with and without multiple transmissions: a sub-codebook with feedback information bits for the DCI with multiple transmissions, and a sub-codebook with feedback information bits for the DCI without multiple transmissions. The two sub-codebooks are then concatenated. In one example, the sub-codebook corresponding to PDCCH without multiple transmissions may be generated and put in front of the sub-codebook corresponding to PDCCH with multiple transmissions. This is friendly to HARQ timeline since HACK/NACK bits for PDSCH corresponding to PDCCH with multiple transmission may be generated relative late due to receiving of multiple PDCCH transmissions. In some other examples, the two sub-codebooks are concatenated in an order determined based on the reference PDCCH for codebook generation for the DCI with multiple transmissions and the single PDCCH transmission for the DCI without multiple transmissions.

In the example shown in FIG. 7, sub-codebook 2 corresponding to PDCCH with multiple transmissions is in the order {ACK/NACK 1, ACK/NACK 3}, and sub-codebook 1 corresponding to PDCCH without multiple transmissions is in the order {ACK/NACK 2, ACK/NACK 4}; and the sub-codebook 2 is concatenated to the sub-codebook 1. In some other examples, the sub-codebook 2 may be referred to as first sub-codebook while the sub-codebook 1 may be referred to as second sub-codebook.

In this example, the HARQ-ACK codebook may be concatenated as: {ACK/NACK 2, ACK/NACK 4, ACK/NACK 1, ACK/NACK 3}.

Alternatively, the concatenation order of the two sub-codebooks may be defined based on the order of the first PDCCH in each sub-codebook, where the first PDCCH for sub-codebook corresponding to multiple transmissions is denoted by the first one of the reference PDCCHs for HARQ-ACK codebook generation. As shown in FIG. 7, for sub-codebook 2, there are two references PDCCHs 512A and 512B used for HARQ-ACK codebook generation. The first one of the reference PDCCHs for sub-codebook 2 is the PDCCH in the first slot, e.g., 512A. The first PDCCH for sub-codebook 1 is the PDCCH in the second slot, e.g., 510C. Thus, the sub-codebook 1 corresponding to PDCCH without multiple transmissions is concatenated to the sub-codebook 2 corresponding to PDCCH with multiple transmissions.

Thus, the HARQ-ACK codebook may alternatively be concatenated as: {ACK/NACK 1, ACK/NACK 3, ACK/NACK 2, ACK/NACK 4}.

For sub-codebook corresponding to PDCCH with multiple transmission, HARQ-ACK bits are concatenated according to the order of the reference PDCCHs. As shown in FIG. 7, ACK/NACK 3 is concatenated to ACK/NACK 1 since the reference PDCCH 512B for ACK/NACK 3 is in the fifth slot and the reference PDCCH 512A for ACK/NACK 1 is in the first slot.

Though it is shown in FIG. 7 that the first PDCCH of the multiple transmissions for one DCI serves as the reference PDCCH for both DAI counting and HARQ-ACK codebook generation for PDCCH with multiple transmissions, it is possible that the first PDCCH serves as the reference PDCCH for DAI counting and the last PDCCH serves as the reference PDCCH for HARQ-ACK codebook generation in realization of separate DAI counting and HARQ-ACK codebook generation.

Figure 8:
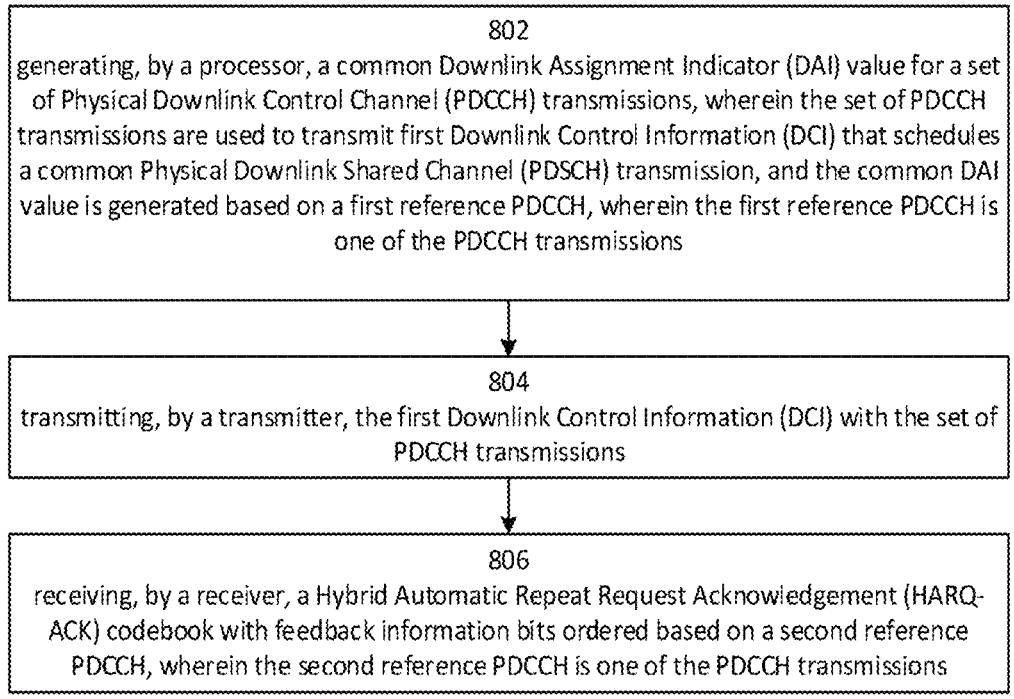
FIG. 8 is a flow chart illustrating steps of DAI counting and HARQ-ACK codebook generation for enhanced PDCCH transmission by NE in accordance with some implementations of the present disclosure.

FIG. 8 is a flow chart illustrating steps of DAI counting and HARQ-ACK codebook generation for enhanced PDCCH transmission by NE in accordance with some implementations of the present disclosure.

At step 802, the processor 302 of NE 300 generates a common Downlink Assignment Indicator (DAI) value for a set of Physical Downlink Control Channel (PDCCH) transmissions, where the set of PDCCH transmissions are used to transmit first Downlink Control Information (DCI) that schedules a common Physical Downlink Shared Channel (PDSCH) transmission, and the common DAI value is generated based on a first reference PDCCH, the first reference PDCCH being one of the PDCCH transmissions.

At step 804, the transmitter 312 of NE 300 transmits the first Downlink Control Information (DCI) with the set of PDCCH transmissions.

At step 806, the receiver 314 of NE 300 receives a Hybrid Automatic Repeat Request Acknowledgement (HARQ-ACK) codebook with feedback information bits ordered based on a second reference PDCCH, wherein the second reference PDCCH is one of the PDCCH transmissions.

The first and second reference PDCCHs may be determined from a list of the PDCCH transmissions, which is sorted at first level according to Control Resource Set Pool (CORESETPool), or Control Resource Set (CORESET), or activated Transmission Configuration Indication (TCI) state index, at second level according to Component Carrier (CC) index, and at third level according to PDCCH monitoring occasion index. The first one in the list may be determined as the first reference PDCCH and the second reference PDCCH; or the first one in the list may be determined as the first reference PDCCH and the second reference PDCCH.

Figure 9:
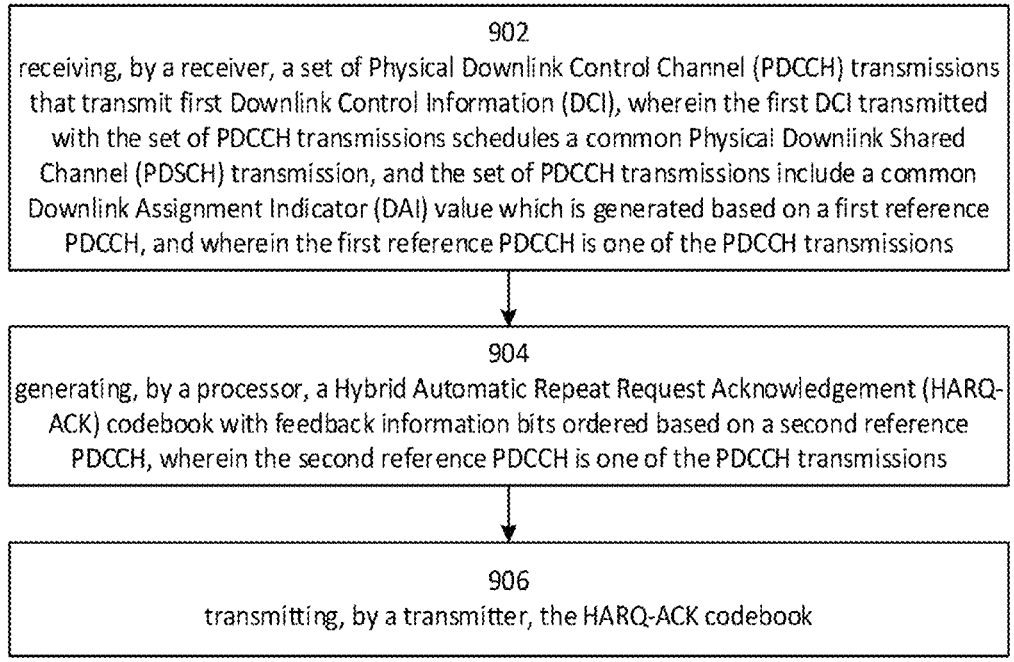
FIG. 9 is a flow chart illustrating steps of DAI counting and HARQ-ACK codebook generation for enhanced PDCCH transmission by UE in accordance with some implementations of the present disclosure.

FIG. 9 is a flow chart illustrating steps of DAI counting and HARQ-ACK codebook generation for enhanced PDCCH transmission by UE in accordance with some implementations of the present disclosure.

At step 902, the receiver 214 of UE 200 receives a set of Physical Downlink Control Channel (PDCCH) transmissions that transmit first Downlink Control Information (DCI), where the first DCI transmitted with the set of PDCCH transmissions schedules a common Physical Downlink Shared Channel (PDSCH) transmission, and the set of PDCCH transmissions include a common Downlink Assignment Indicator (DAI) value which is generated based on a first reference PDCCH, and where the first reference PDCCH is one of the PDCCH transmissions.

At step 904, the processor 202 of UE 200 generates a Hybrid Automatic Repeat Request Acknowledgement (HARQ-ACK) codebook with feedback information bits ordered based on a second reference PDCCH, wherein the second reference PDCCH is one of the PDCCH transmissions.

At step 906, the transmitter 212 of UE 200 transmits the HARQ-ACK codebook.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:
1. A network equipment (NE) for wireless communication, comprising:
at least one memory; and
at least one processor coupled with the at least one memory and configured to cause the NE to:
generate a common Downlink Assignment Indicator (DAI) value for multiple Physical Downlink Control Channel (PDCCH) transmissions, wherein the multiple PDCCH transmissions are used to transmit first Downlink Control Information (DCI) that schedules a common Physical Downlink Shared Channel (PDSCH) transmission, and the common DAI value is generated based on a first reference PDCCH, and wherein the first reference PDCCH is one of the multiple PDCCH transmissions;
transmit the first DCI that schedules the common PDSCH transmission using the multiple PDCCH transmissions, wherein each of the multiple PDCCH transmissions includes the common DAI; and
receive a Hybrid Automatic Repeat Request Acknowledgement (HARQ-ACK) codebook with feedback information bits ordered based on a second reference PDCCH, wherein the second reference PDCCH is one of the multiple PDCCH transmissions.

2. The NE of claim 1, wherein the first reference PDCCH and the second reference PDCCH are determined from a list of the PDCCH transmissions, and wherein the list of the PDCCH transmissions is:
   sorted at a first level according to one or more of a Control Resource Set Pool (CORESETPool), a Control Resource Set (CORESET), or an activated Transmission Configuration Indication (TCI) state index;
   sorted at second level according to Component Carrier (CC) index; and
   sorted according to PDCCH monitoring occasion index.

3. The NE of claim 2, wherein:
   a first PDCCH transmission in the list of PDCCH transmissions is determined as the first reference PDCCH and the second reference PDCCH; or
   the first PDCCH transmission in the list is determined as the first reference PDCCH, and a last PDCCH on the list of PDCCH transmissions is determined as the second reference PDCCH.

4. The NE of claim 1, wherein the at least one processor is further configured to cause the NE to:
   transmit a second DCI with a single PDCCH transmission;
   generate a second DAI value based on the single PDCCH transmission; and
   determine the common DAI value and the second DAI value based on a list of DCI.

5. The NE of claim 4, wherein the second DAI value is independent from the common DAI value for the first DCI, and wherein the list of DCI comprises a first sub-list for the first DCI and a second sub-list for the second DCI.

6. The NE of claim 4, wherein the at least one processor is further configured to cause the NE to:
   generate a plurality of common DAI values for a plurality of first DCI and a plurality of second DAI values for a plurality of second DCI, wherein the list of DCI comprises a combined list of DCI comprising the plurality of first DCI and the plurality of second DCI, and wherein the common DAI values are determined according to the combined list of DCI.

7. The NE of claim 1, wherein the at least one processor is further configured to cause the NE to:
   transmit a second DCI with a single PDCCH transmission, wherein the feedback information bits of the HARQ-ACK codebook are concatenated based on a list of DCI.

8. The NE of claim 7, wherein the at least one processor is further configured to cause the NE to:
   transmit a plurality of first DCI and a plurality of second DCI, wherein the list of DCI comprises a combined list of the first DCI and the second DCI, and wherein the feedback information bits of the HARQ-ACK codebook are concatenated based on the combined list of the first DCI and the second DCI.

9. The NE of claim 1, wherein the at least one processor is further configured to cause the NE to:
   transmit a second DCI with a single PDCCH transmission;
   generate a second DAI value based on the single PDCCH transmission;
   determine the common DAI value and the second DAI value based on a list of DCI; and
   sort the list of DCI based on one of the first reference PDCCH or the second reference PDCCH for the first DCI, and the single PDCCH transmission for the second DCI, including to:
      sort the list of DCI at a first level according to one or more of a Control Resource Set Pool (CORESETPool), a Control Resource Set (CORESET), or an activated Transmission Configuration Indication (TCI) state index;
      sort the list of DCI at second level according to Component Carrier (CC) index; and
      sort the list of DCI according to a PDCCH monitoring occasion index.

10. A user equipment (UE) for wireless communication, comprising:
   at least one memory; and
   at least one processor coupled with the at least one memory and configured to cause the UE to:
      receive multiple Physical Downlink Control Channel (PDCCH) transmissions that transmit first Downlink Control Information (DCI) that schedules a common Physical Downlink Shared Channel (PDSCH) transmission, wherein the multiple PDCCH transmissions include a common Downlink Assignment Indicator (DAI) value which is generated based on a first reference PDCCH, and wherein the first reference PDCCH is one of the multiple PDCCH transmissions;
      generate a Hybrid Automatic Repeat Request Acknowledgement (HARQ-ACK) codebook with feedback information bits ordered based on a second reference PDCCH, wherein the second reference PDCCH is one of the multiple PDCCH transmissions; and
      transmit the HARQ-ACK codebook.

11. The UE of claim 10, wherein the first reference PDCCH and the second reference PDCCH are determined from a list of the PDCCH transmissions, and wherein the list of the PDCCH transmissions is:
   sorted at first level according to one or more of a Control Resource Set Pool (CORESETPool), a Control Resource Set (CORESET), or an activated Transmission Configuration Indication (TCI) state index;
   sorted at second level according to Component Carrier (CC) index; and
   sorted at third level accordingly to PDCCH monitoring occasion index.

12. The UE of claim 11, wherein:
   a first PDCCH transmission in the list of PDCCH transmissions is determined as the first reference PDCCH and the second reference PDCCH; or
   the first PDCCH transmission in the list is determined as the first reference PDCCH, and a last PDCCH on the list of PDCCH transmissions is determined as the second reference PDCCH.

13. The UE of claim 10, wherein the at least one processor is further configured to cause the UE to:
   receive a second DCI with a single PDCCH transmission including a second DAI value based on the single PDCCH transmission; and
   determine the common DAI value and the second DAI value based on a list of DCI.

14. The UE of claim 13, wherein the second DAI value is independent from the common DAI value for the first DCI, and wherein the list of DCI comprises a first sub-list for the first DCI and a second sub-list for the second DCI.

15. The UE of claim 13, wherein the at least one processor is further configured to cause the UE to:
   receive a plurality of first DCI including a plurality of common DAI values and a plurality of second DCI including a plurality of second DAI values, wherein the list of DCI comprises a combined list of the plurality of first DCI and the plurality of second DCI, and wherein the common DAI values are determined according to the combined list of DCI.

16. The UE of claim 10, wherein the at least one processor is further configured to cause the UE to:
receive a second DCI with a single PDCCH transmission, wherein the feedback information bits of the HARQ-ACK codebook are concatenated based on a list of DCI.

17. The UE of claim 16, wherein the at least one processor is further configured to cause the UE to:
receive a plurality of first DCI and a plurality of second DCI, wherein the list of DCI comprises a combined list of the first DCI and the second DCI, and wherein the feedback information bits of the HARQ-ACK codebook are concatenated based on the combined list of the first DCI and the second DCI.

18. The UE of claim 16, wherein the HARQ-ACK codebook comprises a first sub-codebook with feedback information bits for the first DCI with multiple transmissions, and a second sub-codebook with feedback information bits for the second DCI without multiple transmissions, and at least one of:
the first sub-codebook is concatenated after the second sub-codebook;
the first sub-codebook and the second sub-codebook are concatenated in an order determined based on the first reference PDCCH of the first DCI and the single PDCCH transmission of the second DCI; or
the first sub-codebook and the second sub-codebook are concatenated in an order determined based on the second reference PDCCH of the first DCI and the single PDCCH transmission of the second DCI.

19. A method performed by a network equipment (NE), the method comprising:
generating a common Downlink Assignment Indicator (DAI) value for multiple Physical Downlink Control Channel (PDCCH) transmissions, wherein the multiple PDCCH transmissions are used to transmit first Downlink Control Information (DCI) that schedules a common Physical Downlink Shared Channel (PDSCH) transmission, and the common DAI value is generated based on a first reference PDCCH, and wherein the first reference PDCCH is one of the multiple PDCCH transmissions;
transmitting the first DCI that schedules the common PDSCH transmission using the multiple PDCCH transmissions, wherein each of the multiple PDCCH transmissions includes the common DAI; and
receiving a Hybrid Automatic Repeat Request Acknowledgement (HARQ-ACK) codebook with feedback information bits ordered based on a second reference PDCCH, wherein the second reference PDCCH is one of the multiple PDCCH transmissions.

20. A method performed by a user equipment (UE), the method comprising:
receiving multiple Physical Downlink Control Channel (PDCCH) transmissions that transmit first Downlink Control Information (DCI) that schedules a common Physical Downlink Shared Channel (PDSCH) transmission, wherein the multiple PDCCH transmissions include a common Downlink Assignment Indicator (DAI) value which is generated based on a first reference PDCCH, and wherein the first reference PDCCH is one of the multiple PDCCH transmissions;
generating a Hybrid Automatic Repeat Request Acknowledgement (HARQ-ACK) codebook with feedback information bits ordered based on a second reference PDCCH, wherein the second reference PDCCH is one of the multiple PDCCH transmissions; and
transmitting the HARQ-ACK codebook.

* * * * *